(12) United States Patent
Singh et al.

(10) Patent No.: US 11,073,301 B2
(45) Date of Patent: Jul. 27, 2021

(54) HEAT PUMP WITH INTEGRATED ENERGY RECOVERY VENTILATOR (ERV)

(71) Applicant: Johnson Controls Technology Company, Auburn Hills, MI (US)

(72) Inventors: Sandeep Singh, Mississauga (CA); Sasa Misaljevic, Toronto (CA); Nivedita Nath, Pune (IN); Deepak Shetty, Post Bejai Mangalore (IN); Biplab Bardhan, Pune (IN)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 15/953,259

(22) Filed: Apr. 13, 2018

(65) Prior Publication Data

US 2019/0316807 A1    Oct. 17, 2019

(51) Int. Cl.
*F24F 13/20* (2006.01)
*F24F 12/00* (2006.01)

(52) U.S. Cl.
CPC ............ *F24F 13/20* (2013.01); *F24F 12/001* (2013.01); *F24F 2203/021* (2013.01)

(58) Field of Classification Search
CPC ........ F24F 13/20; F24F 12/001; F24F 12/006; F24F 12/003; F24F 3/001; F24F 3/08; F24F 1/0007; F24F 1/02; F24F 1/027; F24F 2203/021; F24D 15/04; F24D 5/10; F24D 5/12; F28F 2009/004
See application file for complete search history.

(56) References Cited

U.S. PATENT DOCUMENTS

| | | | |
|---|---|---|---|
| 3,308,634 A * | 3/1967 | Smith | F24F 1/02 62/263 |
| 4,544,023 A * | 10/1985 | Marciniak | F25B 13/00 165/48.1 |
| 6,169,849 B1 | 1/2001 | Schmidt | |
| 6,328,095 B1 | 12/2001 | Felber et al. | |
| 6,789,618 B2 | 9/2004 | Pearson | |
| 7,150,314 B2 | 12/2006 | Moffitt | |
| 7,942,193 B2 | 5/2011 | Caldwell | |
| 8,939,826 B2 | 1/2015 | Zorzit et al. | |

(Continued)

FOREIGN PATENT DOCUMENTS

| | | |
|---|---|---|
| CA | 2746405 | 10/2015 |
| CA | 2746405 C * | 10/2015 |

(Continued)

OTHER PUBLICATIONS

American Aldes Ventilation Corporation; "Intelligent HRV-ERV Integrated Vertical Fan Coils," IQ by Aldes, pp. 1-6.

(Continued)

*Primary Examiner* — Tho V Duong
(74) *Attorney, Agent, or Firm* — Fletcher Yoder, P.C.

(57) ABSTRACT

A heating, ventilation, and air conditioning (HVAC) system includes a heat pump having a housing. The HVAC system also includes an energy recovery ventilator (ERV) or heat recover ventilator (HRV) integrated with the heat pump such that an access panel to the ERV or HRV faces outwardly from the housing of the heat pump, and such that the access panel is accessible at an outer boundary of the housing.

17 Claims, 9 Drawing Sheets

(56) References Cited

U.S. PATENT DOCUMENTS

| | | | |
|---|---|---|---|
| 2004/0107723 A1* | 6/2004 | Lee | F24F 1/022 62/406 |
| 2007/0169927 A1* | 7/2007 | Isaka | F24F 12/006 165/248 |
| 2009/0133851 A1* | 5/2009 | Caldwell | F24F 12/006 165/54 |
| 2011/0237175 A1 | 9/2011 | Buseyne et al. | |
| 2014/0190657 A1* | 7/2014 | Heberer | F28F 9/0075 165/4 |
| 2016/0131377 A1* | 5/2016 | Lee | F24F 11/0001 165/252 |

FOREIGN PATENT DOCUMENTS

| | | | |
|---|---|---|---|
| CA | 2705866 | 11/2015 | |
| EP | 2573478 A2 * | 3/2013 | F24F 13/20 |
| WO | WO-2009000974 A1 * | 12/2008 | F24F 12/003 |

OTHER PUBLICATIONS

Reversomatic Manufacturing Limited; "HRV/ERV Installation and Operating Instructions," pp. 1-16.

CGC Group; "Vertical Stack Hybrid Heat Pumps with Integral Heat Recovery Ventilator", Energy in Motion, pp. 1-4.

Nu-Air, "Enerboss 400C Series Vertical Fan Coil Specifications, Installation, Operation and Maintenance Manual", pp. 1-29.

UNILUX VFC "Vertical Stack Fan Coil with Integrated HRV/ERV", pp. 1-4.

Omega Heat Pumps "VHP Series Water Source Vertical Stacked Heat Pumps", Technical Catalogue, Aug. 4, 2017, pp. 1-82.

Assembly of Materials Relating to Vertical Stacked Heat Pump w/Integral ERV VSHYe & VSHPe; pp. 1-67; Accessed Jun. 7, 2018 at the earliest.

* cited by examiner

HEAT PUMP WITH INTEGRATED ENERGY RECOVERY VENTILATOR (ERV)

BACKGROUND

The present disclosure relates generally to heating, ventilation, and air conditioning (HVAC) systems and, more particularly, to a heat pump of the HVAC system.

A wide range of applications exist for HVAC systems. For example, residential, light commercial, commercial, and industrial systems are used to control temperatures and air quality in residences and buildings. Generally, HVAC systems may circulate a fluid, such as a refrigerant, through a closed loop between a first heat exchanger, such as an evaporator coil where the fluid absorbs heat, and a second heat exchanger, such as a condenser where the fluid releases heat.

In some embodiments, the fluid(s) flowing within the closed loop(s) may generally undergo phase changes within the normal operating temperatures and pressures of the system, so that quantities of heat can be exchanged by virtue of the latent heat of vaporization of the fluid. A fan may blow air over, or pull air across, the coils of the heat exchanger(s) in order to condition the air, for example, by a heated or cooled refrigerant. In a heat pump, for example in a vertical stack heat pump, a heat exchanger of the heat pump may operate with a heating coil and/or a cooling coil, depending on the operating mode. For example, during a cooling season, the air-to-refrigerant heat exchanger may receive a cooled refrigerant and may cool the air with the cooled refrigerant. The cooled refrigerant may be cooled via water in a coax cable. During a heating season, the air-to-refrigerant heat exchanger may receive a heated refrigerant and may heat the air with the heated refrigerant. The heated refrigerant may be heated via water in a coax cable. A traditional heat pump, such as a traditional vertical stack heat pump, may also include traditional economizing components that enhance an efficiency of the traditional heat pump. Unfortunately, traditional economizing components may be costly, difficult to install, difficult to access after installation, and difficult to maintain. Accordingly, improved heat pumps and economizing components are desired.

SUMMARY

The present disclosure relates to a heating, ventilation, and air conditioning (HVAC) system includes a heat pump having a housing. The HVAC system also includes an energy recovery ventilator (ERV) or heat recovery ventilator (HRV) integrated with the heat pump such that an access panel to the ERV or HRV faces outwardly from the housing of the heat pump, and such that the access panel is accessible at an outer boundary of the housing.

The present disclosure also relates to a heating, ventilation, and air conditioning (HVAC) system. The HVAC system includes a heat pump having a housing and an air intake formed within the housing. The HVAC system also includes an energy recovery ventilator (ERV) or heat recovery ventilator (HRV) integrated with the heat pump via an integration frame, such that an access panel of the ERV or HRV faces outwardly from the housing of the heat pump. The HVAC system also includes a fresh air input to the ERV or HRV, a stale air input to the ERV or HRV, a stale air output from the ERV or HRV, and a fresh air output from the ERV or HRV, where a common duct includes the fresh air output from the ERV or HRV and the stale air input to the ERV or HRV.

The present disclosure also relates to an assembly configured to integrate with a heat pump. The assembly includes an integration frame having a ledge and an arm extending transverse to the ledge, where the arm includes a portal. The assembly also includes an energy recovery ventilator (ERV) or heat recovery ventilator (HRV) positioned on the ledge of the integration frame, where the ERV or HRV includes a fresh air opening positioned on a face of the ERV or HRV that is disposed adjacent to the arm of the integration frame, and where the ledge of the integration frame extends between the face of the ERV or HRV and the arm of the integration frame.

DETAILED DESCRIPTION

The present disclosure is directed toward a commercial, industrial, or residential heating, ventilation, air conditioning (HVAC) system having a heat pump with an integrated energy recovery ventilator (ERV) or integrated heat recovery ventilator (HRV). It should be noted that certain examples may be described below with respect to the ERV in particular, but that the same or similar features apply to the HRV. That is, the presently disclosed embodiments relating to the integration features are the same or similar for the ERV and the HRV.

The disclosed heat pump, for example a vertical stack heat pump, may include one or more coax cables utilized to transfer heat between water and a refrigerant. The heat pump may also include a heat exchanger configured to receive the heated or cooled refrigerant, and to exchange heat between the refrigerant and an air flow passing over the heat exchanger. The HVAC system may include one or more external heat exchangers configured to heat/cool the water outside of the heat pump, such that the water is temperature controlled for return to the heat pump. Thus, during a cooling season, the direct exchange coil may receive a cooled refrigerant, and may cool the air with the cooled refrigerant. During a heating season, the direct exchange coil, may receive a heated refrigerant, and may heat the air with the heated refrigerant. However, it should be noted that the temperature of the water utilized to heat/cool the refrigerant may be dependent on an ambient temperature. Thus, during the cooling season, the entering water temperature is typically higher than the entering water temperature during the heating season. That is, the entering water temperature during the cooling season may be approximately 80-90 degrees Fahrenheit, whereas the entering water temperature during the heating season may be approximately 60-70 degrees Fahrenheit.

The heat pump may also include economizing components that enhance an efficiency of the heat pump. For example, the heat pump in accordance with the present disclosure may include an integrated ERV. "Integrated" may refer to the ERV being incorporated in the heat pump unit, for example the vertical stack heat pump unit, as opposed to being positioned in an area separate from the vertical stack heat pump unit and having duct work to the vertical stack heat pump unit. The heat pump includes a stale air input to the ERV, a fresh air input to the ERV, a stale air output from the ERV, and a fresh air output from the ERV. The ERV is configured to receive fresh air from the fresh air input, to receive stale air (or bathroom air) from the stale air input, to exchange heat and/or moisture between the stale air and the fresh air, to output the stale air through the stale air output to environment, and to output the fresh air through the fresh air output and into an air intake of the heat pump. The conditioned fresh air is combined in the air intake with return air, which may be a volume of air returned to the heat pump from a conditioned space. The aforementioned heat exchanger of the heat pump may receive the combination of the conditioned fresh air and the return air, and may supply the combined air flow ("supply air") to the conditioned space. In other words, the ERV reuses energy from the stale air to improve an efficiency of the heat pump and to condition the fresh air combined with the return air. The ventilated and conditioned volume of air, referred to as supply air, is then routed toward one or more rooms of the conditioned space for conditioning the one or more rooms.

In some embodiments, a motorized damper may be disposed in the fresh air output extending from the ERV, which receives the conditioned fresh air from the ERV. The motorized damper may be configured to actuate, in certain operating modes, to close the fresh air output to block fresh air flow through the ERV. In doing so, the motorized damper may protect the ERV from freezing conditions when a temperature of the fresh air is lower than a threshold temperature.

The heat pump, in accordance with the present disclosure, may include features that improve accessibility of the ERV over traditional embodiments. For example, the heat pump may include a housing in which components of the heat pump are disposed. An air intake, a coil, or both may be disposed within the housing of the heat pump. In accordance with the present disclosure, the ERV may be integrated with the heat pump such that an access panel of the ERV faces outwardly from the housing. In some embodiments, the ERV may be positioned along, and accessible at, an outer boundary of the housing of the heat pump. For example, the heat pump housing may include a lateral, outward facing side on which the access panel of the ERV is disposed. It should be noted that the "outer boundary" may refer to an outer boundary of the housing of the heat pump unit. Vertical stack heat pumps in accordance with the present disclosure may be installed on a side of a dry wall opposing the space being conditioned, but may include an access door in the dry wall to the heat pump. The access door is not considered a part of the housing or outer boundary thereof. Further, a gasket extending between the access door and the housing, which may operate to block permeation of vibrations from the heat pump to the dry wall, is not considered a part of the housing or outer boundary thereof.

It should be noted that the above described "access door" through the dry wall to the heat pump is different than the "access panel" of the integrated ERV. The access panel of the integrated ERV facilitates access to the ERV, instead of other components of the heat pump, and is disposed at or along the outer boundary of the housing of heat pump. The access panel also faces outwardly from the housing of the heat pump. By facing the access panel outwardly from the housing, and by positioning the ERV along the outer boundary of the housing, the ERV can be routinely accessed from a position external to the heat pump, without requiring significant disassembly of portions of the heat pump. Further, a tool clearance adjacent to the access panel may be improved by present embodiments. Thus, access to the ERV, which may be done for maintenance/repair/replacement purposes, is improved over traditional embodiments in which a traditional economizing component is disposed in other areas of the heat pump, and/or in which the traditional economizing component is oriented differently than the disclosed ERV.

Further to the points above, the presently disclosed ERV may be a part of an integration assembly configured to facilitate integration of the ERV with the heat pump. The integration assembly may be utilized to integrate the ERV with a newly developed heat pump, and/or the integration assembly may be utilized to retrofit the ERV with a previous heat pump. The integration assembly may include, for example, an integration frame having a ledge to which the ERV is attached. The ERV may be welded, fastened, or otherwise adhered or coupled to the ledge of the integration frame. In some embodiments, the ERV may be integrally formed with the integration frame. The integration frame may also include one or more arms protruding from the ledge and configured to be welded or otherwise secured to a component of the heat pump, such as a flange on the housing of the heat pump, the air intake of the heat pump, or any combination thereof.

For example, the integration frame may include two arms protruding from either end of the ledge of the integration frame. The two arms may extend transverse to, and in some embodiments substantially perpendicular to, the ledge. The two arms and the ledge may form at least a portion of a receptacle of the integration frame, where the receptacle is configured to receive the flange of the housing, the air intake of the heat pump, or any combination thereof. The arms may be welded or otherwise secured to the corresponding feature(s) of the heat pump in order to rigidly couple the integration frame and the ERV to the heat pump. The arms protruding from the ledge of the integration frame may be joined by an additional ledge at opposing ends of the arms, such that the arms, the ledge, and the additional ledge of the integration frame form a receptacle configured to receive the corresponding feature(s) of the heat pump. In some embodiments, the integration frame may include an air flow portal. For example, an air flow portal may be included in one of the arms of the integration frame to facilitate fluid flow therethrough, as described in detail with reference to the drawings. The integration frame, and the accessibility features of the ERV noted above, facilitate ease of manufacturing of the heat pump and integrated ERV, enable retrofitting the integrated ERV with existing heat pump systems, and enable improved access to the ERV for maintenance/repair/replacement.

Figure 1:
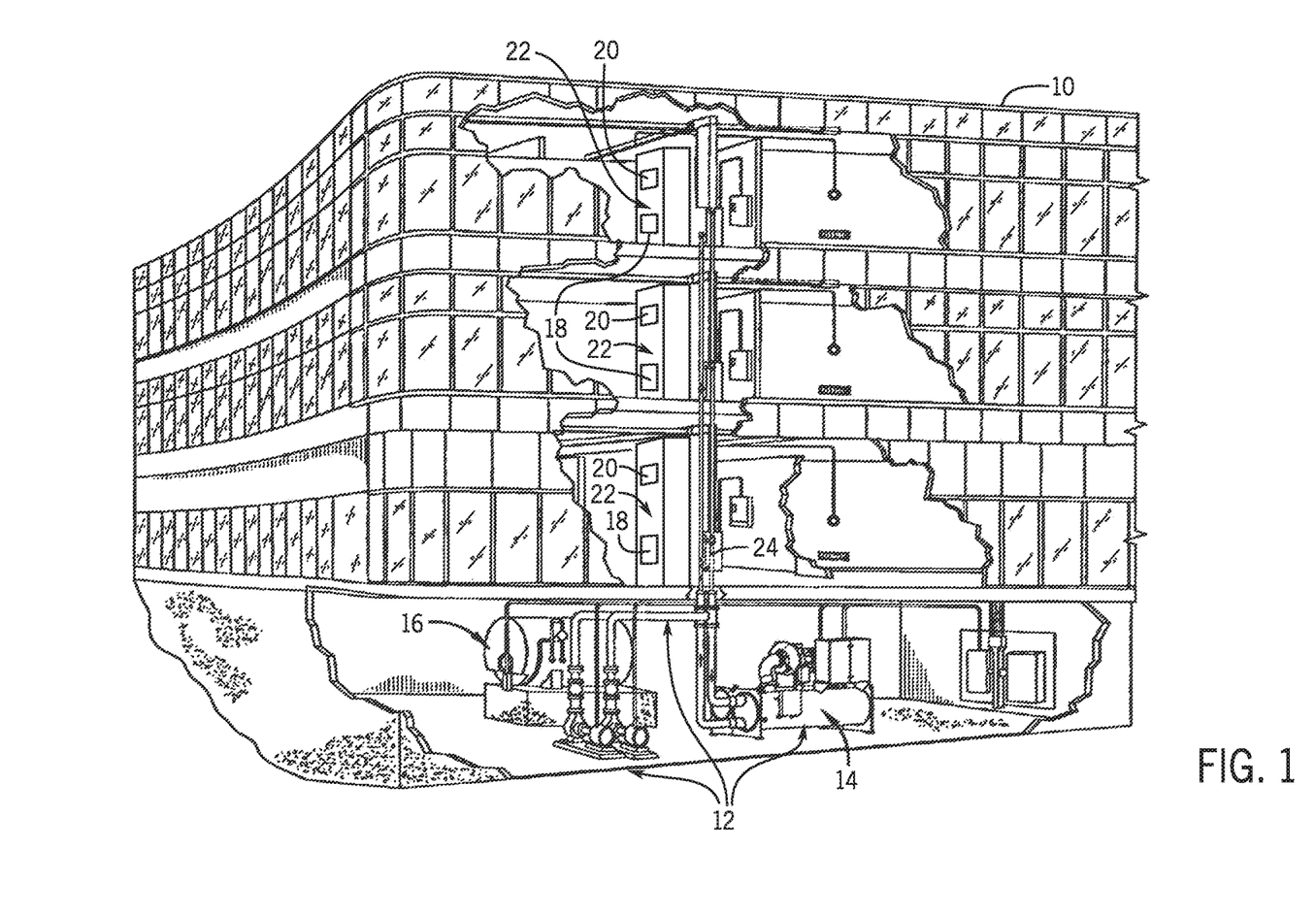
FIG. 1 is a perspective view of an embodiment of a building that may utilize a heating, ventilation, air conditioning, and refrigeration (HVAC&R) system in a commercial setting, in accordance with an aspect of the present disclosure.

Turning now to the drawings, FIG. 1 is a perspective view of an embodiment of an environment for a heating, ventilation, and air conditioning (HVAC) system 12 in a building 10 for a typical commercial setting. The HVAC system 12 may include a vapor compression system 14, such as a chiller, that supplies a chilled liquid, which may be used to cool the building 10. The HVAC system 12 may also include a boiler 16 to supply warm liquid to heat the building 10 and an air distribution system which circulates air through the building 10. The air distribution system may include one or more heat pumps 22, such as vertical stack heat pumps, each of which includes a return air opening 18, and an air supply outlet 20. As shown, several rooms/units in the building 10 may each include a heat pump 22 having a corresponding return air opening 18 and air supply outlet 20.

In some embodiments, the heat pump 22 may include a heat exchanger that is connected to the boiler 16 and the vapor compression system 14 by conduits 24. The heat exchanger within the heat pump 22 may receive warm liquid from the boiler 16 and/or chilled liquid from the vapor compression system 14, depending on the mode of operation of the HVAC system 12. The HVAC system 12 is shown with a separate heat pump unit 22 on each floor of building 10, but in other embodiments, the HVAC system 12 may include heat pumps 22 and/or other components that may be shared between or among floors. Additionally, individual rooms of the building 10 may be associated with a respective heat pump 22. Further, in some embodiments, the heat pumps 22 may be mounted to ceilings within the building 10.

Figure 2:
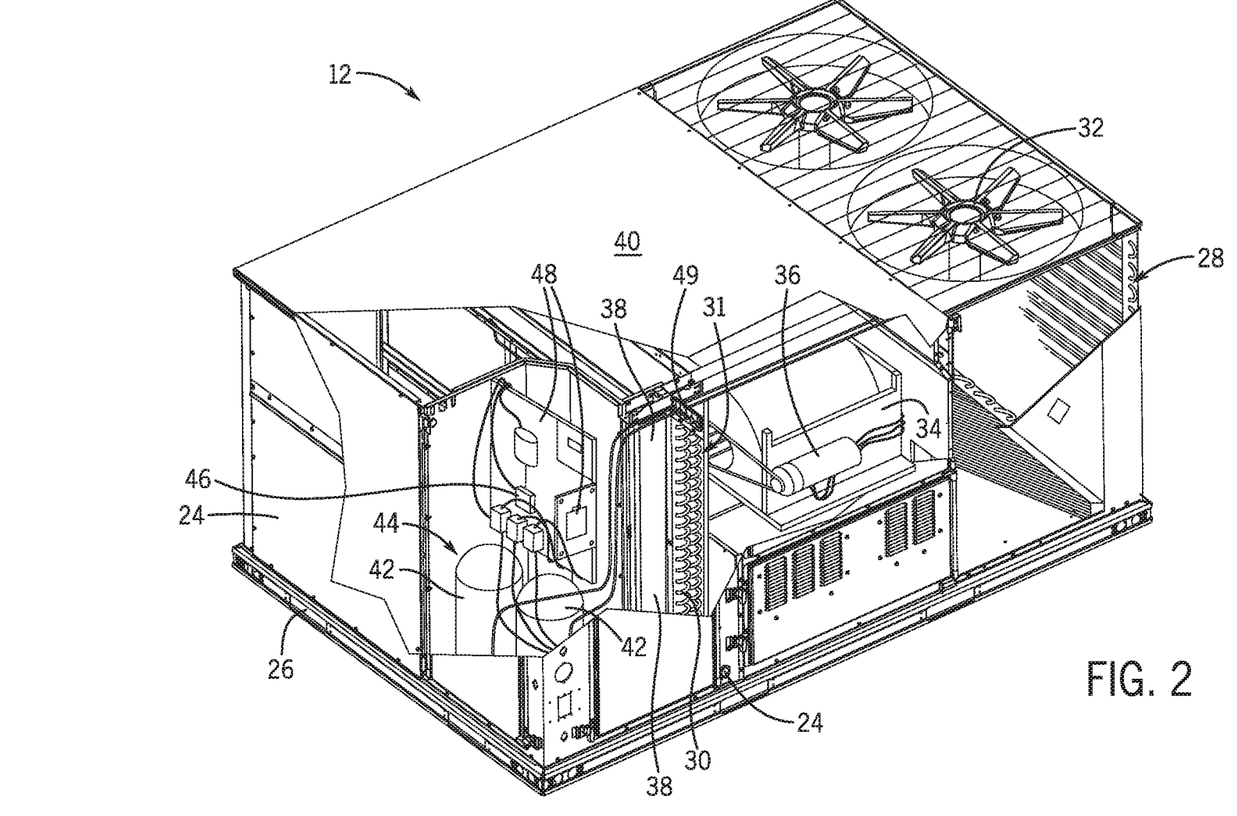
FIG. 2 is an illustration of an embodiment of a packaged unit of an HVAC system, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
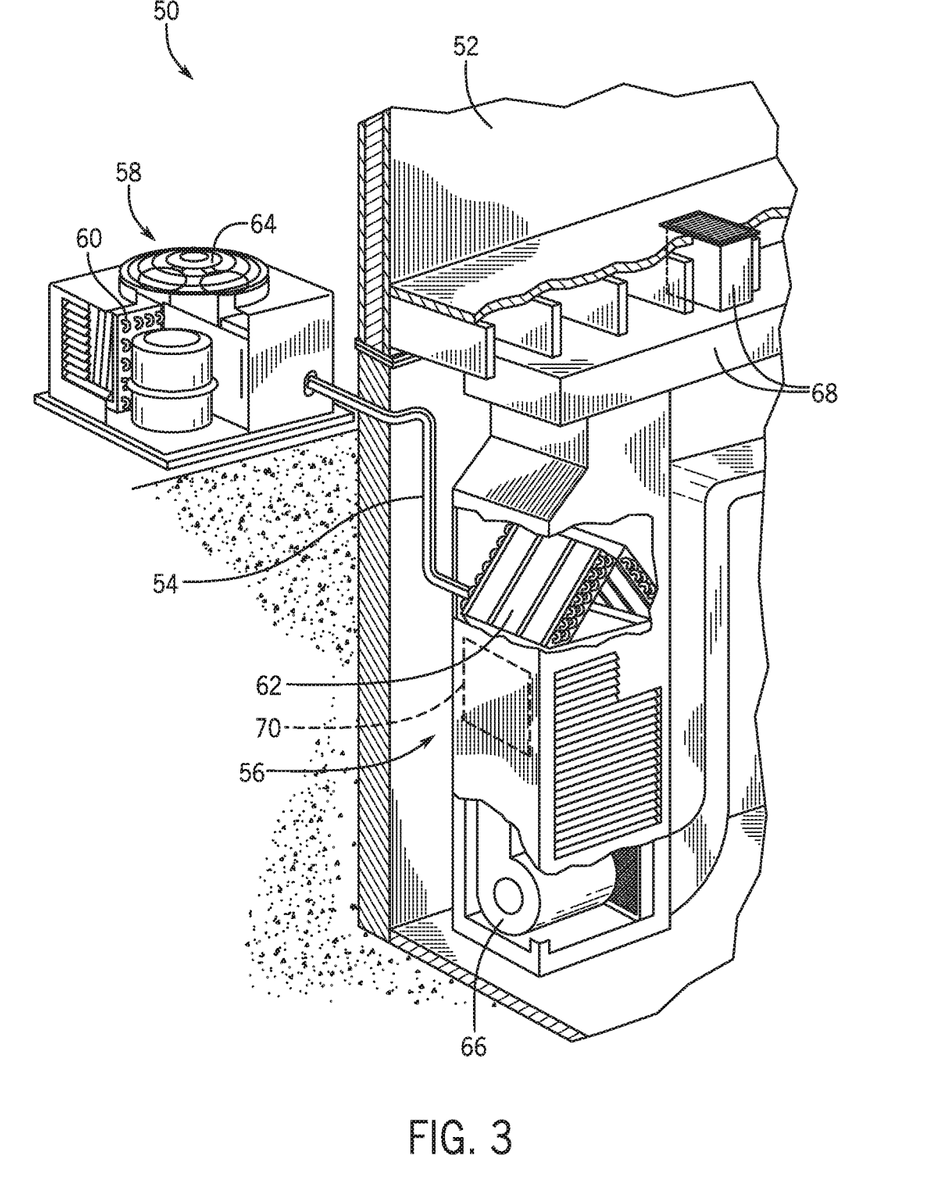
FIG. 3 is an illustration of an embodiment of a split system HVAC system shown, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or a set point plus a small amount, the residential heating and cooling system 50 may become operative to refrigerate additional air for circulation through the residence 52. When the temperature reaches the set point, or a set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger (that is, separate from heat exchanger 62), such that air directed by the blower 66 passes over the tubes or pipes and extracts heat from the combustion products. The heated air may then be routed from the furnace system 70 to the ductwork 68 for heating the residence 52.

Figure 4:
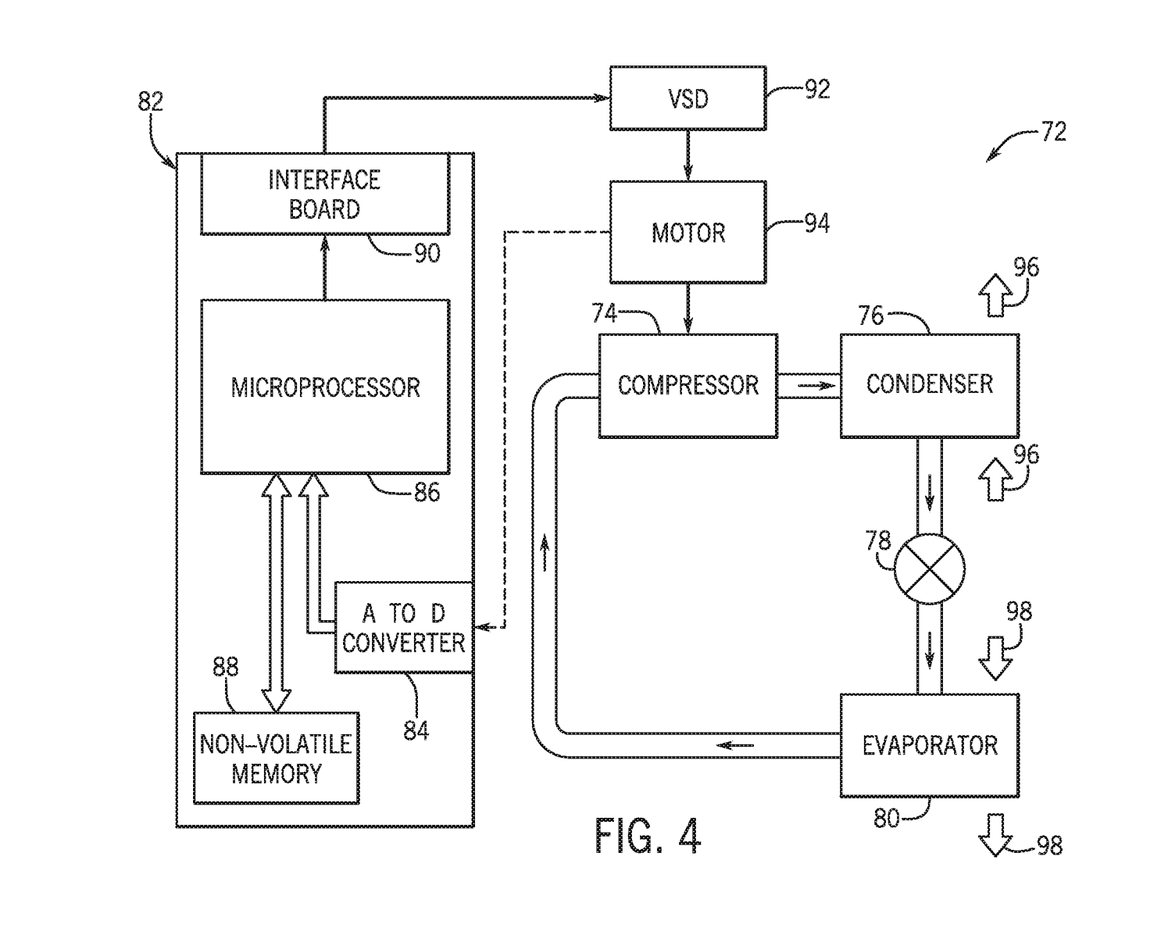
FIG. 4 is a schematic diagram of an embodiment of a refrigeration system of the HVAC system, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

It should be appreciated that any of FIGS. 1-4 may include, in accordance with an aspect of the present disclosure, a heat pump having an integrated energy recover ventilator (ERV). As previously described, the ERV may be integrated with the heat pump such that an access panel of the ERV is disposed along (and accessible at) an outer boundary of the housing, and/or such that the access panel faces outwardly from the housing. Further, the ERV may be a part of an integration assembly that facilitates integrating the ERV with the heat pump. In accordance with the present disclosure, the integrated ERV facilitates retrofitting of the ERV with existing heat pump systems, enables improved assembly of the heat pump system, and enables improved access to the ERV for maintenance/repair/replacement. The heat pump, the integrated ERV, and the integration assembly are described in detail below with reference to later drawings.

Figure 5:
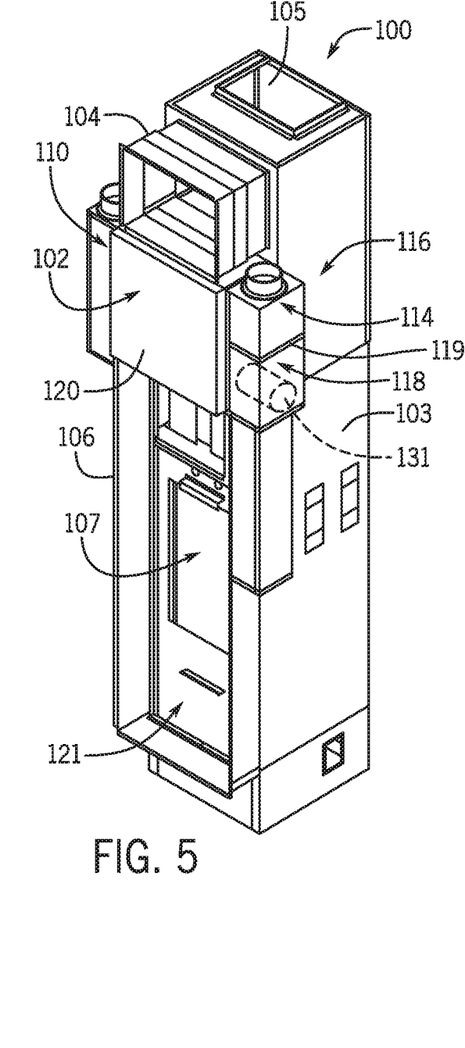
FIG. 5 is an illustration of a front perspective view of an embodiment of a vertical stack heat pump having an integrated energy recovery ventilator (ERV) for use in the HVAC system of FIG. 1, in accordance with an aspect of the present disclosure.

FIG. 5 is an illustration of a front perspective view of an embodiment of a heat pump 100 having an integrated energy recovery ventilator (ERV) 102 for use in an HVAC system, such as the HVAC system of FIG. 1. Other embodiments of the present disclosure may include the ERV 102 integrated with an HVAC system other than the illustrated heat pump 100 or the heat pump 22 of FIG. 1, such as those illustrated in FIGS. 2-4 and described in detail above. The heat pump 22 includes a fresh air input 110 to the ERV 102, a stale air input 114 to the ERV 102, a fresh air output 118 from the ERV 102, and a stale air output 112 from the ERV 102, noting that the stale air output 112 of the ERV 102 is hidden in FIG. 5 but can be seen in FIG. 6. The ERV 102 includes openings coupled with the fresh air input 110, the stale air input 114, the fresh air output 118, and the stale air output 112, and configured to receive the corresponding air flows there through. The ERV 102 may condition fresh outside air (received from the fresh air input 110) with stale (or "bathroom") air (received from the stale air input 114), thereby enhancing a temperature and moisture content of the fresh air, which is output through the fresh air output 118. The spent stale air is output from the ERV 102 through the stale air output 118. As shown, the fresh air output 118 and the stale air input 114 may be disposed in a common or integral duct 116, which includes a baffle 119 separating the fresh air flow from the stale air flow. These and other features are described in detail below.

The heat pump 100 of FIG. 5 is illustrated in a vertical stack arrangement, similar to the heat pump 22 of FIG. 1. In the illustrated embodiment, the heat pump 100 includes a housing 103 having a supply air flange 104 and a return air flange 106. The return air flange 106 is configured to receive return air from a space conditioned by the heat pump 100, the heat pump 100 is configured to condition fresh air by heat/moisture exchange via the ERV 102, and the supply air flange 104 is configured to output the return air mixed with the conditioned fresh air, the combination of which may be referred to as "supply air," to the conditioned space. In some embodiments, ductwork may couple at additional outputs 105 of the heat pump 100, such that the supply air can be ducted to other rooms.

The return air flange 106 may be a part of an air intake 107 of the heat pump 100. The air intake 107 may include, for example, a blower configured to move the return air into the air intake 107, and to output the supply air through the supply air flange 104. The blower is hidden within the housing 103 of the heat pump 100 in the illustrated embodiment, but can be seen in the embodiment of the heat pump 100 illustrated in FIG. 9. The blower of the air intake 107 may also cause air flow through the integrated ERV 102, although one or more additional blowers of the ERV 102 may facilitate at least some of the air flow through the ERV 102 in certain embodiments.

The heat pump 100 also includes features configured to block the fresh air flow through the ERV 102 during certain operating modes/conditions. For example, the heat pump 100 includes a damper 131 disposed in the fresh air output 118. The damper 131 in the illustrated embodiment is a motorized damper, separate from the ERV 102, and disposed downstream of the ERV 102 within the fresh air output 118. The damper 131 may be configured to block the fresh air flow when a temperature of the fresh air is too low. Thus, the damper 131 protects against freezing of the ERV 102. For example, the damper 131 may be coupled to a general controller of the heat pump 100, or a controller of the ERV 102, which instructs a closing of the fresh air output 118 when a temperature of the fresh air is below a threshold temperature.

Figure 6:
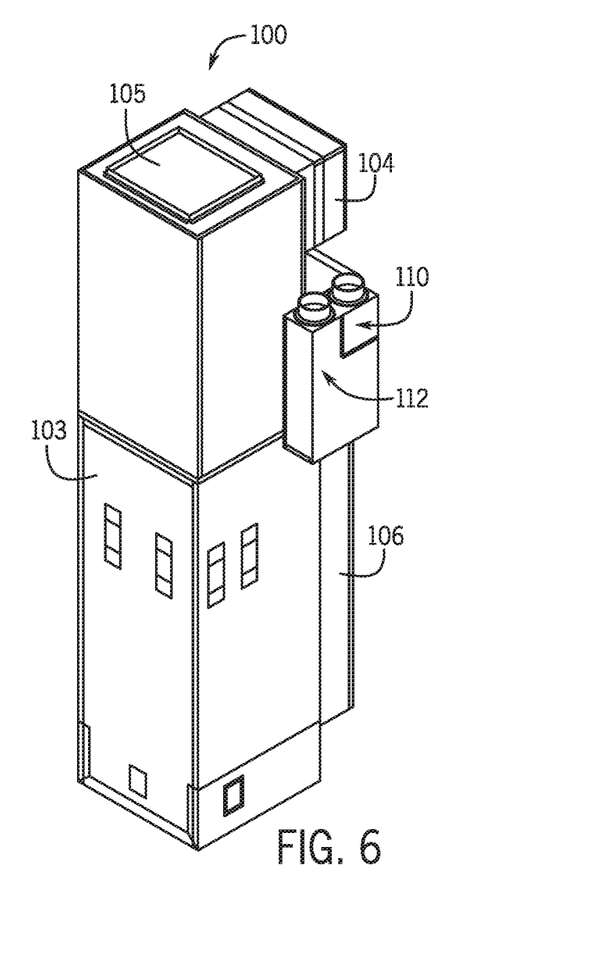
FIG. 6 is an illustration of a rear perspective view of an embodiment of the vertical stack heat pump and integrated ERV of FIG. 5, in accordance with an aspect of the present disclosure.

As shown in FIG. 6, which is a rear perspective view of an embodiment of the heat pump 100 and integrated ERV 102 of FIG. 5, the heat pump 100 includes the fresh air input 110 to the ERV 102 and the stale air input 114 to the ERV 102. The ERV 102 is configured to receive the fresh air and the stale air, and to condition the fresh air with the stale air. The fresh air output 118 of the ERV 102 may couple directly to the air intake 107, as previously described, and will be described in detail with reference to later drawings. Thus, the ERV 102 receives a portion of fresh air, receives a portion of stale air, conditions the portion of fresh air with the portion of stale air, outputs the portion of stale air to environment, and outputs the conditioned fresh air to the air intake 107. Conditioning the fresh air with the stale air in the ERV 102 may include heat and/or moisture exchange that depends on seasonal conditions, as described below.

Figure 7:
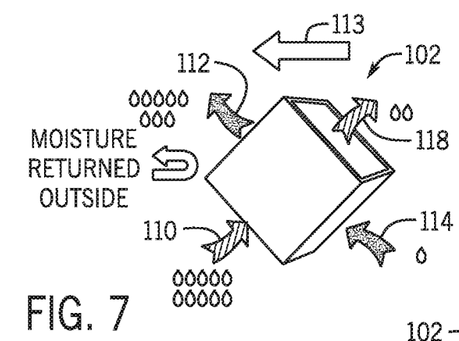
FIG. 7 is a schematic illustration of an embodiment of the integrated ERV of FIG. 5 during a cooling mode, in accordance with an aspect of the present disclosure.

For example, one operating mode of the ERV 102 is illustrated in FIG. 7, which is indicative of the ERV 102 operating during a cooling mode or season. During the cooling season, the stale air supplied via the stale air input 114 may be used to cool the fresh air supplied via the fresh air input 110. In other words, the stale air may extract heat from the fresh air, as indicated by heat transfer direction 113, such that the heat is rejected to environment through the stale air output 112. The cooled fresh air may then be routed from the fresh air output 118 directly into the air intake 107 illustrated in FIG. 5 in order to mix with return air, where the mixture or "supply air" is routed toward a conditioned space. During the cooling season, moisture is also transferred within the ERV 102 from the fresh air to the stale air, such that a moisture content of the fresh air is reduced prior to emptying the fresh air into the air intake 107 for mixture with the return air. Thus, during the cooling season, the fresh air supplied from the ERV 102 to the air intake 107 may cool the return air without significantly moisturizing the return air, and the combined mixture or "supply air" is utilized to condition a space. The stale air having the extracted heat and moisture may be exhausted from the ERV 102, via the stale air output 112, to environment.

Figure 8:
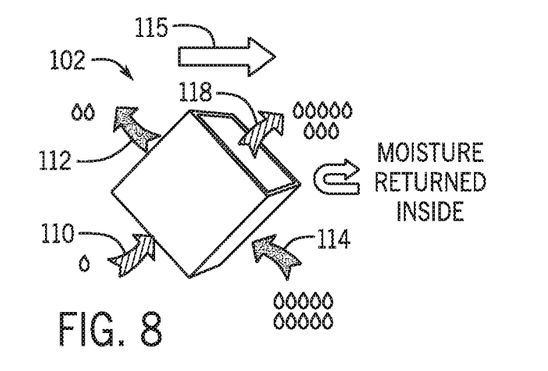
FIG. 8 is a schematic illustration of an embodiment of the integrated ERV of FIG. 5 during a heating mode, in accordance with an aspect of the present disclosure.

Another operating mode of the ERV 102 is illustrated in FIG. 8, which is indicative of the ERV 102 operating during a heating mode or season. During the heating season, the stale air supplied via the stale air input 114 is used to heat the fresh air supplied via the fresh air input 110. In other words, the fresh air may extract heat from the stale air, as indicated by heat transfer direction 115. During the heating season, moisture is also transferred from the stale air to the fresh air, such that a moisture content of the fresh air is increased prior to emptying the fresh air into the air intake 107 illustrated in FIG. 5. Thus, during the heating season, the fresh air supplied to the air intake 107 illustrated in FIG. 5 may heat the return air and/or increases a moisture content within the return air. The combination of the return air and the conditioned fresh air or "supply air" is supplied to the space to condition the space, as previously described. As is the case during the cooling season, the stale air is output from the ERV 102, following heat/moisture exchange, via the stale air output 112.

With the above functionality in mind, it should be noted that seasonal maintenance of the ERV 102 may improve an efficiency of the ERV 102 and heat pump 100 as a whole. The present disclosure includes enhanced accessibility features of the ERV 102 at least for installation/maintenance/repair/replacement purposes. For example, focusing again on the embodiment illustrated in FIG. 5, the ERV 102 includes an access panel 120 facing outwardly from the housing 103 of the heat pump 100. The access panel 120 is also disposed along, or accessible at, an outer boundary of the housing 103. That is, the housing 103 of the heat pump 100 includes a lateral face 121 extending along the outer boundary of the housing 103, and the access panel 120 is positioned within or immediately adjacent to the lateral face 121. The position and orientation of the ERV 102 and corresponding access panel 120 in FIG. 5 facilitates improved access to the ERV 102 and improves ease of assembly/manufacturing/retrofitting of the heat pump 100 and integrated ERV 102. These and other features will be described in detail below with reference to the drawings, and in particular the "outer boundary" noted above will be described with reference to FIG. 11.

Further, it should be noted that, in certain embodiments, a heat recovery ventilator (HRV) may be utilized with the disclosed heat pump 100. The HRV facilitates the same heat transfer noted above with respect to the ERV 102, but the HRV does not transfer moisture. That is, while the ERV 102 transfers sensible and latent heat, the HRV transfers only sensible heat.

Figure 9:
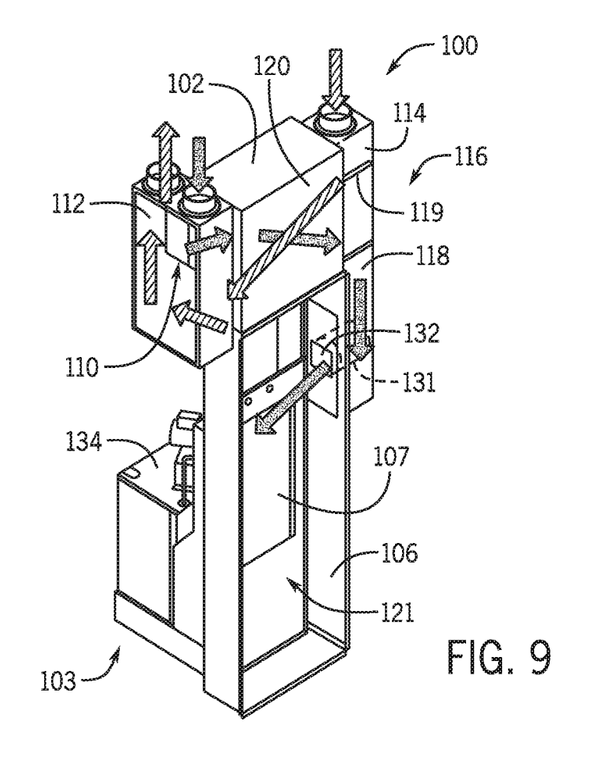
FIG. 9 is an illustration of a front perspective view of an embodiment of a portion of the vertical stack heat pump and integrated ERV of FIG. 5, in accordance with an aspect of the present disclosure.

FIG. 9 is a front perspective view of an embodiment of a portion of the heat pump 100 and integrated ERV 102 of FIG. 5, illustrating certain features relating to the integration, installation, and accessibility of the ERV 102. For example, as previously described, the ERV 102 is positioned on the heat pump 100 such that the access panel 120 of the ERV 102 faces outwardly from the housing 103 of the heat pump 100, and/or such that the access panel 120 is accessible at the outer boundary of the housing 103, as illustrated in, and described with respect to, FIG. 11. The positioning/orientation of the ERV 102 and corresponding access panel 120 facilitates improved access to the ERV 102, which facilitates improved maintenance and installation of the ERV 102.

The heat pump 100 also includes the fresh air input 110 to the ERV 102, the stale air input 114 to the ERV 102, the stale air output 112 from the ERV 102, and the fresh air output 118 from the ERV 102, where the integral duct 116 includes both the stale air input 114 and the fresh air output 118. A baffle 119 within the integral duct 116 separates the stale air of the stale air input 114 from the fresh air of the fresh air output 118. The integral duct 116 may couple the fresh air output 118 directly to the air intake 107, such that the fresh air is emptied directly into the air intake 107. In the illustrated embodiment, the return air flange 106 of the housing 103 of the heat pump 100 includes a portal 132 that fluidly couples the fresh air output 118 portion of the integral duct 116 with the air intake 107. A blower/motor assembly 134 of the air intake 107 is configured to draw the return air into the air intake 107, and may be configured to draw the fresh air from the fresh air output 118 into the air intake 107. In another embodiment, a separate blower or flow biasing assembly may be utilized to move the fresh air and/or the stale air. The above-described features reduce a part count of the heat pump 100, and a size of the heat pump 100, and, as previously described, improves an integration/installation of the ERV 102 with the heat pump 100. As previously described, the damper 131 in the fresh air output 118 may be configured to block air flow through the fresh air output when the fresh air temperature is less than a threshold temperature, thereby protecting the ERV 102 from a freezing condition.

Figure 10:
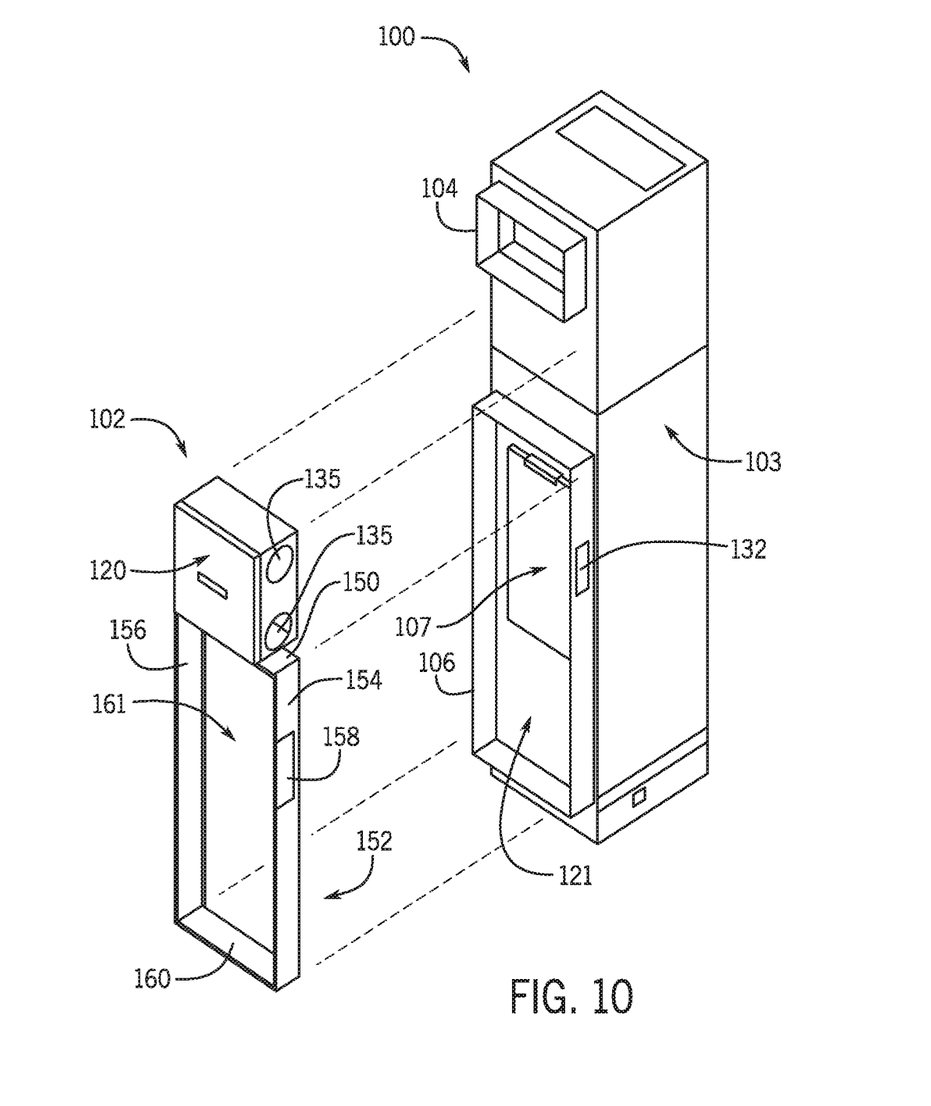
FIG. 10 is an illustration of an exploded front perspective view of an embodiment of the vertical stack heat pump and integrated ERV of FIG. 5, in accordance with an aspect of the present disclosure.

In accordance with present embodiments, an assembly may be used to integrate the ERV 102 with the heat pump 100. In some embodiments, the assembly may be a retro-fitting assembly configured to enable integration of the ERV 102 with an existing heat pump 100, although the assembly may be utilized for integrating the ERV 102 with a new heat pump 100. FIG. 10 is an illustration of an exploded front perspective view of an embodiment of the heat pump 100 and integrated ERV 102 of FIG. 5. The ERV 102 includes openings 135 which correspond to the previously described fresh air and stale air inputs and outputs. In the illustrated embodiment, the ERV 102 is positioned on a ledge 150 of an integration frame 152 of the heat pump 100. For example, the ERV 102 may be welded, fastened, or otherwise coupled or adhered to the ledge 150. In some embodiments, the ledge 150 and the ERV 102 may be integrally formed.

The integration frame 152 also includes a first arm 154 extending transverse to the ledge 150 and a second arm 156 extending transverse to the ledge 150. The first arm 154 and/or the second arm 156 may extend perpendicular to the ledge 150 in certain embodiments. An additional ledge 160 may join the first arm 154 with the second arm 156 at ends of the arms 154, 156 opposing the ledge 150. The ledge 150, the first arm 154, the second arm 156, the additional ledge 160, or any combination thereof, may at least partially form an receptacle 161 of the integration frame 152, where the receptacle 161 is configured to receive one or more components of the heat pump 100 in order to integrate the integration frame 152 and the corresponding ERV 102 with the heat pump 100. In the embodiment illustrated in FIG. 10, the receptacle 161 may be configured to receive the return air flange 106 of the heat pump 100. It should be noted that the receptacle 161 may be configured to receive additional or alternate components of the heat pump 100, such as components of the air intake 107, a duct coupled with the air intake 107, other flanges of the heat pump 100, such as the supply air flange 104, and/or other components or combinations thereof. In some embodiments, the integration frame 152 may be welded to the heat pump 100, such as to the return air flange 106 in the illustrated embodiment. For example, the integration frame 152 may be welded to the return air flange 106 along the first arm 154 of the integration frame 152, the second arm 156 of the integration frame 152, the ledge 150 of the integration frame 152, the additional ledge 160 of the integration frame 152, or any combination thereof.

In accordance with present embodiments, additional features may be utilized to integrate the ERV 102 and the heat pump 100. For example, the first arm 154 may include a portal 158 configured to fluidly couple, by way of the duct 116 illustrated in FIG. 9, the fresh air output 118 of the ERV 102 and the air intake 107 of the heat pump 100. Indeed, the return air flange 106 of the housing 103 of the heat pump 100 may include a corresponding portal 132 or cutout that, when aligned with the portal 158 of the integration frame 152, enables fresh air to be routed into the air intake 107.

Figure 11:
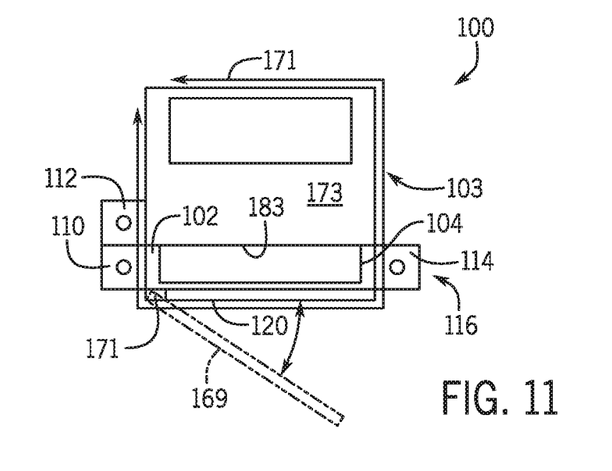
FIG. 11 is an illustration of a top view of the vertical stack heat pump and integrated ERV of FIG. 5, in accordance with an aspect of the present disclosure.

As previously described, the disclosed integration of the ERV 102 with the heat pump 100 facilitates improved installation and access to the ERV 102 and corresponding components. To further illustrate, FIG. 11 is a top view of the heat pump 100 and integrated ERV 102 of FIG. 5. The housing 103 includes an outer boundary 171, and the access panel 120 of the ERV 102 is positioned along, and accessible at or from, the outer boundary 171 of the housing 103. The access panel 120 also faces outwardly from an interior of the housing 103. By positioning the ERV 102 such that the access panel 120 is accessible at the outer boundary 171 of the housing 103, and such that the access panel 120 faces and opens outwardly from the interior of the housing 103, accessibility to the ERV 102 is improved over traditional embodiments. As shown, the ERV 102 may include an ERV door 169 and a hinge 171, where the ERV door 169 rotates about the hinge 171 away from the housing 103 of the heat pump 100.

Figure 12:
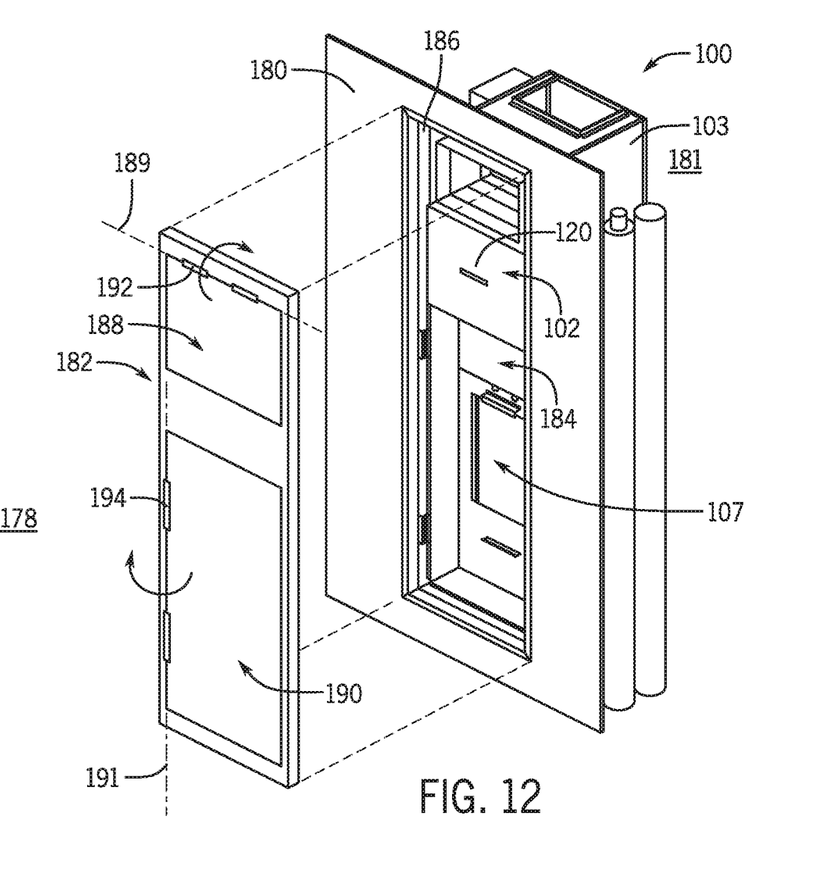
FIG. 12 is a perspective view of an embodiment of a heat pump installed in a residence, in accordance with an aspect of the present disclosure.

FIG. 12 is a perspective view of an embodiment of the heat pump 100 installed in a residence. For example, the residence may include a conditioned space 178, a dry wall 180, and an installation space 181 on a side of the dry wall 180 opposing the conditioned space 178. As previously described, an access door 182 to the heat pump 100 may be installed in an opening 184 of the dry wall 180. In some embodiments, the opening 184 may be fitted with a frame 186, where the frame 186 may include or interface with a gasket between the dry wall 180 and the heat pump 100. The gasket of or interfaced with the frame 186 may block vibration permeation from the heat pump 100 to the dry wall 180.

In accordance with present embodiments, the access door 182 may include a first access portal 188 and a second access portal 190. The first access portal 188 may facilitate access to the ERV 102, namely, the access panel 120 of the ERV 102. The first access portal 188 may rotate about an upper axis 189 via hinges 192. However, in other embodiments, access portal 188 may be coupled to the access door 182 via features other than the hinges 192, such as clips, flanges, or fasteners. The second access portal 190 may facilitate access to the air intake 107 of the heat pump 100. The second access portal 190 may rotate about a side axis 191 via hinges 194, where the side axis 191 in the illustrated embodiment is perpendicular to the upper axis 189. However, in other embodiments, the access portal 190 may be coupled to the access door 182 via features other than the hinges 192, such as clips, flanges, or fasteners. As previously described, the access door 182 is considered a part of the HVAC system having the heat pump 100, but is not considered a part of the "outer boundary" of the housing 103 of the heat pump 100.

Figure 13:
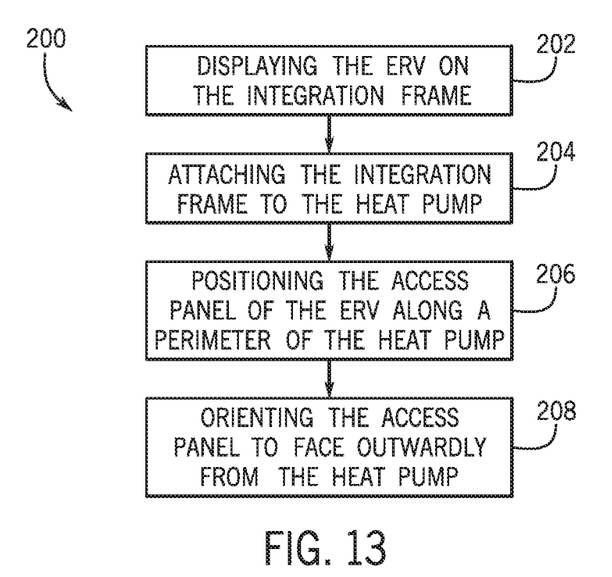
FIG. 13 is a process flow diagram illustrating a method of integrating an ERV with a vertical stack heat pump, in accordance with an aspect of the present disclosure.

FIG. 13 is a process flow diagram illustrating a method 200 of integrating an ERV with a heat pump. The method 200 includes disposing, as indicated by block 202, the ERV on an integration frame. For example, as previously described, the ERV may be disposed on a ledge of the integration frame. The ERV may be welded, fastened, adhered, or otherwise coupled to the ledge of the integration.

The method 200 also includes attaching, as indicated by block 204, the integration frame to the heat pump. For example, as previously described, the integration frame may include an arm extending from the ledge and transverse to the ledge, and the arm may be fastened, welded, adhered, or otherwise coupled to a component of the heat pump, such as a return air flange protruding from a housing of the heat pump. In some embodiments, the integration frame may include a first arm extending from a first end of the ledge and a second arm extending from a second end of the ledge. The ledge, the first arm, and the second arm may form a receptacle configured to receive a component of the heat pump, such as the flange of the housing of the heat pump. In some embodiments, a rectangular receptacle may be formed by the ledge, the first arm, the second arm, and an additional ledge extending between the first arm and the second arm.

The method 200 also includes positioning, as indicated by block 206, an access panel of the ERV along or at an outer boundary of the heat pump. For example, the integration frame may be coupled to the heat pump such that the access panel of the ERV is disposed along the outer boundary of the heat pump. The method 200 also includes orienting, as indicated by block 208, the ERV such that the access panel faces outwardly from the heat pump, or from a housing of the heat pump. By positioning the access panel of the ERV along the outer boundary of the heat pump, and by facing the access panel outwardly from the heat pump, the access panel may be opened away from the heat pump without interfering with heat pump components. In other words, the ERV integrated with the heat pump in accordance with the present disclosure facilitates improved access to the ERV, which improves installation and maintenance procedures.

In accordance with the present disclosure, the ERV integrated with the heat pump for improved accessibility to the ERV access panel reduces installation and maintenance complexity. The improved installation and maintenance features may facilitate more routine maintenance and repair, which enhances an efficiency and effectiveness of the ERV and corresponding heat pump.

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed embodiments. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilation, and air conditioning (HVAC) system, comprising:
   a heat pump comprising a housing;
   an energy recovery ventilator (ERV) or heat recovery ventilator (HRV) integrated with the heat pump such that an access panel to the ERV or HRV faces outwardly from the housing of the heat pump, and such that the access panel is disposed along an outer boundary of the housing; and
   an integration frame having a ledge to which the ERV or HRV is attached, wherein the integration frame is coupled to the heat pump and includes a portal which couples an interior of the ERV or HRV with an air intake of the heat pump.

2. The HVAC system of claim 1, wherein the heat pump comprises a fresh air output from the ERV or HRV, and wherein the portal of the integration frame couples the fresh air output from the ERV or HRV with the air intake of the heat pump.

3. The HVAC system of claim 1, comprising a common duct having a fresh air output of the ERV or HRV and a stale air input to the ERV or HRV.

4. The HVAC system of claim 3, wherein the common duct comprises a baffle disposed therein and configured to separate a stale airflow in the stale air input from a fresh air flow in the fresh air output.

5. The HVAC system of claim 1, wherein the integration frame comprises a first arm extending from the ledge and a second arm extending from the ledge, and wherein the ledge, the first arm, and the second arm at least partially form a receptacle configured to receive a flange of the housing of the heat pump.

6. The HVAC system of claim 2, comprising a motorized damper disposed within the fresh air output and external to the ERV or HRV, wherein the motorized damper is configured to selectively block a flow of fresh air therethrough based on a temperature of the fresh air.

7. The HVAC system of claim 1, comprising an access door disposed outside the outer boundary of the housing of the heat pump, and configured to facilitate access to the ERV or HRV and to an air intake of the heat pump.

8. The HVAC system of claim 1, wherein the access panel comprises a hinge and an ERV or HRV door, and wherein the hinge is configured to enable the ERV or HRV door to open away from an interior of the housing of the heat pump.

9. A heating, ventilation, and air conditioning (HVAC) system, comprising:
   a heat pump having a housing and an air intake formed within the housing;
   an energy recovery ventilator (ERV) or heat recovery ventilator (HRV) integrated with the heat pump via an integration frame coupled to the heat pump such that an access panel of the ERV or HRV faces outwardly from the housing of the heat pump, and such that the access panel is disposed along an outer boundary of the housing, wherein the integration frame comprises a ledge to which the ERV or HRV is attached and a portal which couples an interior of the ERV or HRV with the air intake of the heat pump; and
   a fresh air input to the ERV or HRV, a stale air input to the ERV or HRV, a stale air output from the ERV or HRV, and a fresh air output from the ERV or HRV.

10. The HVAC system of claim 9, wherein a common duct comprises the fresh air output from the ERV or HRV and the stale air input to the ERV or HRV, and wherein the common duct comprises a baffle that is configured to divide a stale air flow of the stale air input from a fresh air flow of the fresh air output.

11. The HVAC system of claim 9, comprising an access door of the heat pump, wherein the access door is disposed external to the outer boundary of the housing and adjacent to the access panel of the ERV or HRV.

12. The HVAC system of claim 1, wherein the ERV or HRV comprises a common duct having a fresh air output of the ERV or HRV and a stale air input to the ERV or HRV, wherein the ERV or HRV is integrated with the heat pump via an integration frame, and wherein the integration frame comprises:
   a portal coupling the common duct with an air intake of the ERV or HRV;
   a ledge to which the ERV or HRV is attached;
   a first arm comprising the portal; and
   a second arm, wherein the ledge, the first arm, and the second arm at least partially form a receptacle which receives a portion of the heat pump to fix the integration frame to the portion of the heat pump.

13. The HVAC system of claim 12, wherein the portion of the heat pump comprises the air intake.

14. The HVAC system of claim 12, wherein the first arm, the second arm, the ledge, or any combination thereof is welded to the portion of the heat pump to fix the integration frame to the portion of the heat pump.

15. A heating, ventilation, and air conditioning (HVAC) system, comprising:
   a heat pump having a housing and an air intake formed within the housing;
   an energy recovery ventilator (ERV) or heat recovery ventilator (HRV) integrated with the heat pump via an integration frame such that an access panel of the ERV or HRV faces outwardly from the housing of the heat pump; and
   a fresh air input to the ERV or HRV, a stale air input to the ERV or HRV, a stale air output from the ERV or HRV, and a fresh air output from the ERV or HRV, wherein a common duct comprises the fresh air output from the ERV or HRV and the stale air input to the ERV or HRV; wherein the integration frame comprises a portal coupling the common duct with the air intake, wherein the integration frame comprises a ledge to which the ERV or HRV is attached, a first arm comprising the portal, and a second arm, and wherein the ledge, the first arm, and the second arm at least partially form a receptacle which receives a portion of the heat pump to fix the integration frame to the portion of the heat pump.

16. The HVAC system of claim 15, wherein the portion of the heat pump comprises the air intake.

17. The HVAC system of claim 15, wherein the first arm, the second arm, the ledge, or any combination thereof is welded to the portion of the heat pump to fix the integration frame to the portion of the heat pump.

* * * * *